United States Patent
Tunc Sarisozen et al.

(10) Patent No.: US 12,551,864 B2
(45) Date of Patent: Feb. 17, 2026

(54) DOUBLE SURFACE MODIFIED POROUS MATERIAL WITH MINIMIZED NONSPECIFIC INTERACTION

(71) Applicant: Waters Technologies Corporation, Milford, MA (US)

(72) Inventors: Yeliz Tunc Sarisozen, Westford, MA (US); Nicole L. Lawrence, Stafford Springs, CT (US); Darryl W. Brousmiche, Grafton, MA (US); MingCheng Xu, Lexington, MA (US); Kevin Wyndham, Upton, MA (US)

(73) Assignee: Waters Technologies Corporation, Milford, MA (US)

( * ) Notice: Subject to any disclaimer, the term of this patent is extended or adjusted under 35 U.S.C. 154(b) by 588 days.

(21) Appl. No.: 18/056,434

(22) Filed: Nov. 17, 2022

(65) Prior Publication Data
US 2023/0182114 A1    Jun. 15, 2023

Related U.S. Application Data

(60) Provisional application No. 63/281,239, filed on Nov. 19, 2021.

(51) Int. Cl.
*B01J 20/289* (2006.01)
*B01D 15/34* (2006.01)
(Continued)

(52) U.S. Cl.
CPC ........... *B01J 20/289* (2013.01); *B01D 15/34* (2013.01); *B01J 20/103* (2013.01);
(Continued)

(58) Field of Classification Search
CPC .. B01J 20/289; B01J 20/103; B01J 20/28052; B01J 20/2808; B01J 20/28083;
(Continued)

(56) References Cited

U.S. PATENT DOCUMENTS

| 4,017,528 A | 4/1977 | Unger et al. |
| 5,861,110 A | 1/1999 | Chieng et al. |

(Continued)

FOREIGN PATENT DOCUMENTS

| EP | 0295073 A2 | 12/1988 |
| EP | 2783749 A2 | 10/2014 |

(Continued)

OTHER PUBLICATIONS

Wang et al., "One-pot preparation of boronic acid and PEG bi-functionalized silica particles for separation and purification of catecholamine from rat serum", New J. Chem., 2015, 39, 8848-8854. (Year: 2015).*

(Continued)

*Primary Examiner* — Anthony J Zimmer
(74) *Attorney, Agent, or Firm* — WOMBLE BOND DICKINSON (US) LLP; Deborah M. Vernon; Scott R. Breining

(57) ABSTRACT

The present disclosure is directed to surface modified materials such as stationary phase materials for performing size exclusion chromatography. Aspects of the present disclosure feature materials surface modified with a moiety including a polyethylene glycol (PEG) functionality and a moiety comprising a diol functionality. Such surface modified materials exhibit a reduced propensity for ionic and hydrophobic secondary interactions.

18 Claims, 5 Drawing Sheets

(51) Int. Cl.
   *B01J 20/10*   (2006.01)
   *B01J 20/28*   (2006.01)
   *B01J 20/287*  (2006.01)

(52) U.S. Cl.
   CPC ..... *B01J 20/28052* (2013.01); *B01J 20/2808* (2013.01); *B01J 20/28083* (2013.01); *B01J 20/28085* (2013.01); *B01J 20/287* (2013.01); *B01J 2220/54* (2013.01); *B01J 2220/64* (2013.01); *B01J 2220/66* (2013.01)

(58) Field of Classification Search
   CPC ................ B01J 20/28085; B01J 20/287; B01J 2220/54; B01J 2220/64; B01J 2220/66; B01J 20/28011; B01J 20/28057; B01J 20/28069; B01J 20/28078; B01J 20/288; B01J 20/3204; B01J 20/3248; B01J 20/3272; B01J 20/3285; B01J 20/3293; B01D 15/34
   See application file for complete search history.

(56) References Cited

U.S. PATENT DOCUMENTS

| | | |
|---|---|---|
| 6,528,167 B2 | 3/2003 | O'Gara |
| 6,686,035 B2 | 2/2004 | Jiang et al. |
| 7,175,913 B2 | 2/2007 | O'Gara |
| 7,223,473 B2 | 5/2007 | Jiang et al. |
| 7,919,177 B2 | 4/2011 | Jiang et al. |
| 2015/0133294 A1* | 5/2015 | Wyndham ............ C07F 7/1804 546/14 |

FOREIGN PATENT DOCUMENTS

| | | |
|---|---|---|
| WO | 2008103423 A1 | 8/2008 |
| WO | 2021211863 A1 | 10/2021 |

OTHER PUBLICATIONS

Salehi et al., "Chitosan/polyethylene glycol impregnated activated carbons: Synthesis, characterization and adsorption performance", Front. Chem. Sci. Eng. 2017, 11(4): 575-585. (Year: 2017).*

UniSil Bare Silica product informaiton. Obtained from: http://en.nanomicrotech.com/products/silica-chromatography-media/bare-silica/114.html; accessed May 21, 2025 (Year: 2025).*

Daley et al. "An "Iceberg" Coating Preserves Bulk Hydration Dynamics in Aqueous PEG Solutions." J. Phys. Chem. B. 121. 46(2017): 10574-10582.

International Search Report and Written Opinion issued in International Patent Application No. PCT/IB2022/061109 dated Feb. 15, 2023.

Linda et al. "Methacylate-based Diol Monolithic Stationary Phase for the Separation of Polar and Non-Polar Compounds in Capillary Liquid Chromtaography." Anal. Sci. 29(2013): 631-635.

Wyndham et al. "Characterization and Evaluation of C18 HPLC Stationary Phases Based on Ethyl-Bridged Hybrid Organic/Inorganic Particles." Anal. Chem. 75(2005): 6781-6788.

* cited by examiner

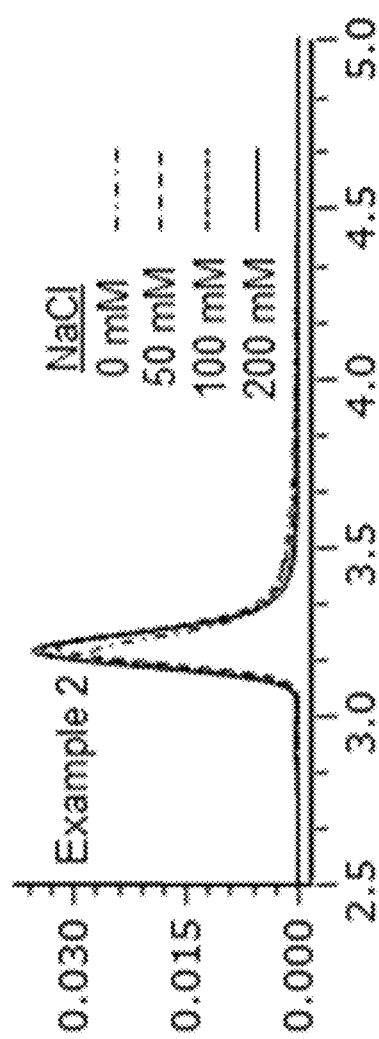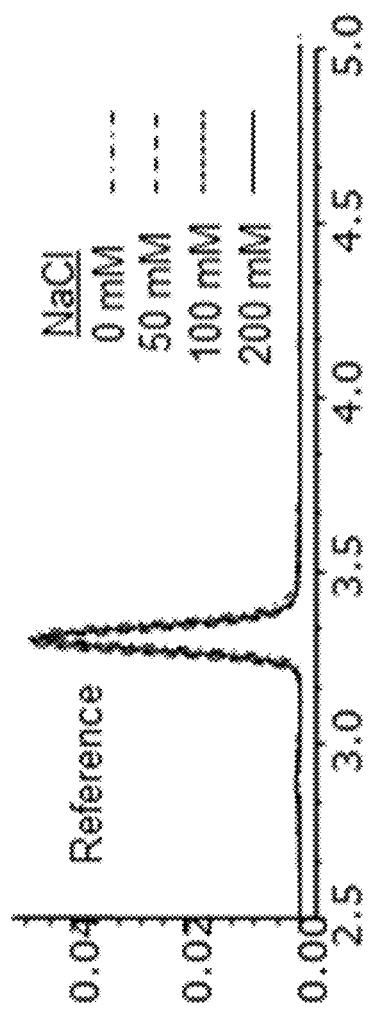

DOUBLE SURFACE MODIFIED POROUS MATERIAL WITH MINIMIZED NONSPECIFIC INTERACTION

CROSS-REFERENCE TO RELATED APPLICATIONS

This patent application claims the priority and benefit of U.S. Provisional Application No. 63/281,239, filed Nov. 19, 2021, and entitled "A Double Surface Modified Porous Material with Minimized Nonspecific Interaction", which is herein incorporated by reference in its entirety.

TECHNICAL FIELD

The present disclosure relates to stationary phase materials for performing size exclusion chromatography. Particularly, the disclosure relates to stationary phase material comprising porous particles having a surface modified with polyethylene glycol and diol groups.

BACKGROUND

Nonspecific interaction of biomolecules with material surfaces is a major issue in many applications. The adverse (e.g., adsorptive) effects of an unmodified material surface with non-specific interaction can be observed in applications such as chromatographic separations. Surface modification with polar groups is a very common strategy to reduce non-specific interactions, for example, in size exclusion chromatography. Size exclusion chromatography (SEC) is a common separation technique that employs differences in hydrodynamic radii to separate solubilized analytes on an immobilized stationary phase. In theory, perfect SEC separates exclusively based on the hydrodynamic radii; however, secondary interactions, such as ionic and hydrophobic interactions, can cause undesired effects including peak broadening, tailing, and loss of resolution and separation efficiency.

Surface modification of stationary phase materials with diol-bondings/coatings is a common strategy used to reduce non-specific interactions in SEC. The major drawback of diol-bonded/coated surfaces is the continued existence of hydrophobic secondary interactions and the related requirement of tedious mobile phase development. Surface modification with polyethylene glycols (PEGs), also referred to as polyethylene oxides (PEOs), is another common strategy used to reduce non-specific interactions. PEGs are amenable to application in both two- and three-dimensional situations, affording coverage of high surface area materials such as porous particles. PEGs are generally hydrophilic in nature, electrical neutral, and possess hydrogen-bond acceptor/donor properties. In addition, PEG surface modification provides a stable hydration layer through hydrogen bonds with nearby water. Without wishing to be bound by theory, it is believed that this hydration layer acts as an additional barrier against non-specific interactions, both ionic and hydrophobic. Therefore, PEG-based surface modifications provide a more effective resistance against non-specific secondary interactions compared to other hydrophilic surface modifications such as diol-bonded/coated surfaces.

SUMMARY

As described above, certain polar surface modifications are available which reduce non-specific interactions of certain analytes during, e.g., chromatographic separations. Despite such surface modifications, it remains desirable in the art to provide materials with surface modifications effective to minimize non-specific secondary interactions, provide high efficiency separations, and which remain unaffected by variations in method parameters.

The present disclosure is generally directed to reducing nonspecific interactions by modifying a material surface with two separate coatings (e.g., bondings): a polyethylene glycol (PEG)-containing functionality and a diol-containing functionality. Without wishing to be bound by theory, it is believed that the PEG-containing functionality further enhances the surface resistance of the PEG-modified material to hydrophobic, nonspecific interactions such as may be encountered during size exclusion chromatography (SEC) separations.

Accordingly, in one aspect is provided a material having a surface, wherein said surface is modified with: a moiety comprising a polyethylene glycol (PEG) functionality at a coverage density of at least 0.05 $\mu mol/m^2$; and a moiety comprising a diol functionality at a coverage density of at least 0.05 $\mu mol/m^2$.

In some aspects, the moiety comprising the PEG functionality is present at a coverage density in a range from about 0.05 to about 15 $\mu mol/m^2$.

In some aspects, the moiety comprising the diol functionality is present at a coverage density in a range from about 0.05 to about 15 $\mu mol/m^2$.

In some aspects, the PEG functionality is hydroxy-terminated. In some aspects, the hydroxy-terminated PEG functionality is a hydroxy-terminated PEG-alkylsilane.

In some aspects, the PEG functionality is alkoxy-terminated. In some aspects, the alkoxy-terminated PEG functionality is an alkoxy-terminated PEG-alkylsilane. In some aspects, the alkoxy-terminated PEG functionality is a methoxy-terminated PEG-alkylsilane.

In some aspects, the moiety comprising the PEG functionality has a formula

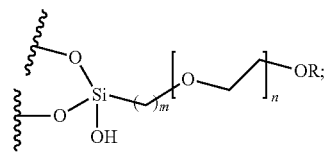

wherein:
R is H or C1-C3 alkyl;
m is an integer from about 1 to about 10;
n is an integer from about 2 to about 50; and
wherein the wavy lines indicate points of attachment to the surface of the material.

In some aspects, n is from about 5 to about 15. In some aspects, n is from about 6 to about 12, from about 6 to about 9, or from about 9 to about 12.

In some aspects, m is 2 or 3

In some aspects, R is $CH_3$, m is about 3, and n is from about 9 to about 12.

In some aspects, R is H, m is about 3, and n is from about 8 to about 12.

In some aspects, the moiety comprising the diol functionality comprises an alkylsilane having a diol terminus.

In some aspects, the moiety comprising the diol functionality has a formula:

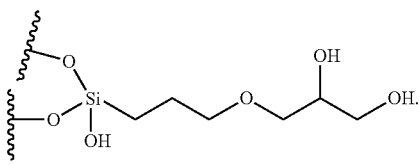 [SMILES: *O[Si](O)(CCCOCC(O)CO)O*]

In some aspects, the material is a polymer or a metal, and where the material is included or contained within a vial, a plate, a pipette tip, or an analytical or sample preparation device.

In some aspects, the material is a porous particulate stationary phase chromatography material.

In some aspects, particles of the porous particulate stationary phase chromatography material have a pore size from about 0 to about 3000 Å, from about 20 to about 3000 Å, or from about 40 to about 1000 Å.

In some aspects, the porous particulate stationary phase chromatography material is silica, a silica/organic hybrid, a polymer, or a combination thereof. In some aspects, the porous particulate stationary phase chromatography material is silica. In some aspects, the porous particulate stationary phase chromatography material is a silica/organic hybrid.

In another aspect is provided a column comprising the porous particulate stationary phase material as disclosed herein, the column having an interior for accepting the stationary phase material.

The above aspects, features, and aspects are further described in connection with the figures and examples provided below.

BRIEF DESCRIPTION OF THE DRAWINGS

In order to provide an understanding of aspects of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIG. 3A depicts exemplary chromatographic separations of NIST mAb on a prototype methoxy-terminated PEG and diol-terminated alkylsilane surface modified inorganic-organic hybrid particle SEC column packed with 3.0 μm particles with average pore sizes of 200 Å, with a mobile phase comprising aqueous sodium phosphate buffer and varying concentrations of sodium chloride.

FIG. 3B depicts exemplary chromatographic separations of NIST mAb on a reference diol-coated inorganic-organic hybrid particle SEC column packed with 3.0 μm particles with average pore sizes of 200 Å column with a mobile phase comprising aqueous sodium phosphate buffer and varying concentrations of sodium chloride.

DETAILED DESCRIPTION

Figure 1:
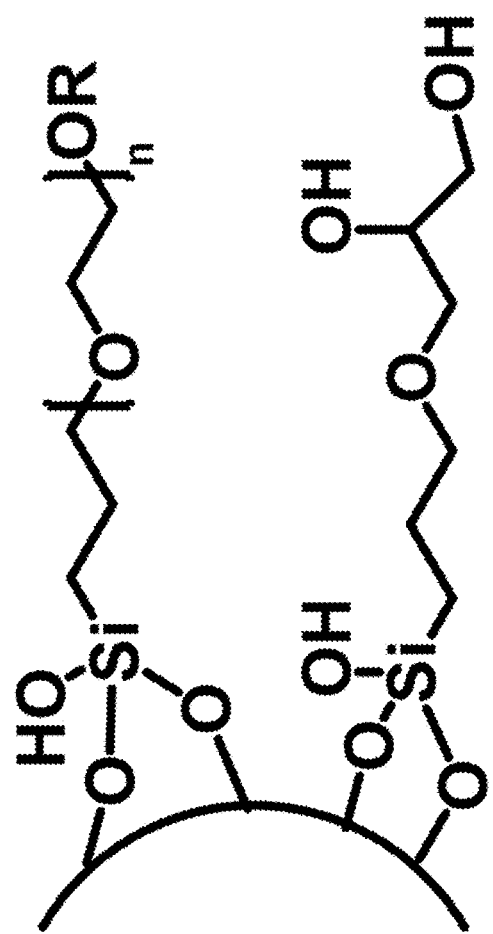
FIG. 1 depicts a particle surface modified with a polyethylene glycol (PEG) containing functionality and a diol containing functionality according to a non-limiting aspect of the disclosure.

Before describing several example aspects of the technology, it is to be understood that the technology is not limited to the details of construction or process steps set forth in the following description. The technology is capable of other aspects and of being practiced or being carried out in various ways.

Definitions

With respect to the terms used in this disclosure, the following definitions are provided. This application will use the following terms as defined below unless the context of the text in which the term appears requires a different meaning The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

"Hybrid", including "inorganic-organic hybrid material," includes inorganic-based structures wherein an organic functionality is integral to both the internal or "skeletal"

inorganic structure as well as the hybrid material surface. The inorganic portion of the hybrid material may be, e.g., alumina, silica, titanium, cerium, or zirconium or oxides thereof, or ceramic material. "Hybrid" includes inorganic-based structures wherein an organic functionality is integral to both the internal or "skeletal" inorganic structure as well as the hybrid material surface. Exemplary hybrid materials are shown in U.S. Pat. Nos. 4,017,528, 6,528,167, 6,686,035, and 7,175,913, each of which is incorporated by reference herein in its entirety. One non-limiting example of an inorganic-organic hybrid material is an ethylene-bridged hybrid material having an empirical formula of $SiO_2(O_{1.5}SiCH_2CH_2SiO_{1.5})_{0.25}$.

The terms "polyethylene glycol" and "polyethylene oxide" are used synonymously herein, both terms referring to oligomeric or polymeric polyether compounds having the formula $-(O-CH_2CH_2)_n-OH$. Accordingly, the abbreviations for "polyethylene glycol" and "polyethylene oxide", "PEG" and "PEO", respectively, are used synonymously herein.

The term "hydroxy-terminated polyethylene glycol", which may be abbreviates as "HO-PEG", refers to oligomeric or polymeric polyether compounds having the formula $-(O-CH_2CH_2)_n-OH$.

The term "methoxy-terminated polyethylene glycol", abbreviated herein as "MeO-PEO" or MeO-PEG", refers to oligomeric or polymeric polyether compounds having the formula $-(O-CH_2CH_2)_n-OMe$. In contrast to hydroxy-terminated polyethylene glycols (HO-PEGs), MeO-PEGs do not have a free hydroxyl (OH) group available, having been terminated with a methyl group.

The term "surface modification" as used herein, refers to the process of modifying the surface of a material by changing physical and/or chemical characteristics of the surface to improve the properties. The term "surface modified" as used herein, refers to a material (e.g., a porous stationary phase particle or core material, or a polymer or metal) which has been reacted with surface modifying groups ("surface modifiers") to covalently bond, non-covalently bond, adsorb, or otherwise attach the surface modifiers to the surface of, e,g, the core material, stationary phase material, or other material. In certain aspects, the surface modifying group is attached to the surface of the material by a siloxane bond. For example, the surface of a hybrid silica material contains silanol groups, which can be reacted with reactive organosilane reagents (e.g., halo or alkoxy substituted silanes), thus producing Si—O—Si—C linkages. The surface modification can be a bonded surface or a coated surface.

The term "bonded surface" refers to a material (e.g., a porous stationary phase particle or core material) which predominantly has a monolayer of covalently attached silane molecules as a result of a bonding reaction between the surface modifying group and available hydroxyl groups on the surface of the material.

The term "coated surface" refers to a material (e.g., a porous stationary phase particle or core material) which has multilayers of the surface modifying group(s) due to oligomer and polymer formation of the surface modifying group(s) and horizontal and vertical polymerization reactions on the surface of the material.

Surface density of the modification may be determined by calculating the difference in % carbon of the material before and after the surface modification, as measured by elemental analysis. Surface density as reported herein is determined according to this calculation.

Reference herein to the "surface" of a material, e.g., a stationary phase particle is, unless otherwise indicated or contradicted by the context, intended to mean the outermost extent of the surface of the material.

Surface Modified Materials

Antibody-drug conjugates (ADCs) often have increased hydrophobicity compared to unmodified proteins due to their payload conjugations, which can interact with the hydrophobic regions of a modified particle, resulting in poor quality separation. Surface modifications (e.g., diol bonding, polyethylene glycol (PEG)-based bonding) may ameliorate to varying degrees such interactions. While these surface modifications can reduce secondary interactions for size exclusion separations, they have their own drawbacks. The major drawback of diol-bonded/coated surfaces is the continued existence of hydrophobic secondary interactions and the related requirement for complex mobile phase development.

Current PEG-based modifications, such as methoxy-terminated polyethylene glycol bonding (MeO-PEG), make surfaces more hydrophilic, protein resistant, nontoxic and biocompatible. PEG-based modifications reduce non-specific interactions and have been incorporated into many different products and platforms. This ubiquity is partly due to its chemical abilities and partly due to its ease of manipulation. PEGs are amenable to both two- and three-dimensional situations, affording coverage of material such as porous particles used in SEC. PEG has the chemical and structural properties that most protein resistant materials and molecules share: hydrophilic nature, electrical neutrality, and hydrogen-bond acceptor/donor properties. PEG is known to create a very stable hydration layer due to the spacing between adjacent ethereal oxygen atoms nearly matching water's hydrogen bonding network. See, e.g., Daley et al., *The Journal of Physical Chemistry B* 2017, 121 (46), 10574-10582. This hydration layer works to repel non-specific interactions, including ionic and hydrophobic. In addition to surface hydration, PEG chain flexibility is also believed to play a significant role in protein resistance. Generally, PEG-based modifications provide a more effective resistance against non-specific secondary interactions compared to diol-bonded surfaces. Despite such modifications, there remains a need for surface modified materials with improved performance with respect to reduced secondary interactions. Such surface modified may find utility in, for example, stationary phase materials for chromatographic separations such as SEC, in coated hardware, or in sample handling devices, vials, plates, and the like.

The present disclosure provides materials having a surface modified with both a moiety comprising a polyethylene glycol (PEG) functionality and a moiety comprising a diol functionality. The nature of the materials and modifications thereto is described further herein below.

Surface Modification

Disclosed herein is a material having a surface, wherein said surface is modified with a moiety comprising a polyethylene glycol (PEG) functionality. The moiety comprising the PEG functionality may vary. For example, it may be linear or branched, and may be terminated with a hydroxyl group or an alkoxy group. In certain aspects, the PEG functionality may be replaced with a polypropylene oxide (PPO) functionality.

The coverage density of the PEG functionality on the material surface may vary. In some aspects, the density of coverage is at least 0.05 $\mu mol/m^2$. In some aspects, the coverage density is in a range from about 0.05 to about 15 $\mu mol/m^2$. For example, in some aspects, the PEG functionality is present on the surface of the material at a density from about 0.3 to about 15 μmol/m², from about 0.3 to about 5 μmol/m², or from about 0.3 to about 2.5 μmol/m².

In some aspects, the PEG functionality is hydroxy-terminated. In some aspects, the hydroxy-terminated PEG functionality is a hydroxy-terminated PEG-alkylsilane.

In some aspects, the PEG functionality is alkoxy-terminated. In some aspects, the alkoxy-terminated PEG functionality is an alkoxy-terminated PEG-alkylsilane. In some aspects, the alkoxy-terminated PEG functionality is a methoxy-terminated PEG-alkylsilane.

In some aspects, the moiety comprising the PEG functionality has a formula:

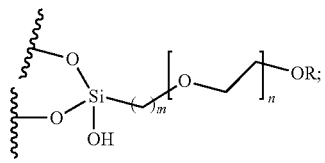

wherein:
R is H or C1-C3 alkyl;
m is an integer from about 1 to about 10;
n is an integer from about 2 to about 50; and
wherein the wavy lines indicate points of attachment to the surface of the material.

In some aspects, m is 1, 2, 3, 4, 5, 6, 7, 8, 9, or 10. In some aspects, m is 2 or 3. In some aspects, m is 3 (i.e., propyl).

In some aspects, n is from about 2, about 5, about 10, about 15, or about 20, to about 25, about 30, about 35, about 40, about 45, or about 50. In some aspects, n is from about 5 to about 15. In some aspects, n is from about 8 to about 12.

In particular aspects, m is 3, and n is from about 8 to about 12. In particular aspects, m is 3, and n is from about 6 to about 9. In particular aspects, m is 3, and n is from about 9 to about 12.

In some aspects, n is an average value representing a mixture of different polyethylene glycol chain lengths. For example, in some aspects, n may be 6 to 12, meaning the average distribution of chain lengths falls between 6 and 12 polyethylene glycol units. Such aspects reflect the average chain length distribution in e.g., a commercially available trialkoxysilylalkyl polyethylene glycol useful in aspects of the disclosure as a surface modifying reagent. In other aspects, n may be a specific value, such as from about 6, about 7, about 8, or about 9, to about 10, about 11, or about 12.

In some aspects, R is H, m is about 3, and n is from about 8 to about 12.

In some aspects, R is CH₃, m is about 3, and n is from about 6 to about 9, or from about 9 to about 12.

In some aspects, the moiety comprising the PEG functionality is attached directly to hydroxy groups on the material surface. In such aspects, the surface, following reaction with the suitable PEG reagent, may be described as a bonded surface. In other aspects, the material surface is modified with a coating layer, either prior to or simultaneously with attachment of the moiety comprising the PEG functionality. In such aspects, the moiety comprising the PEG functionality is attached through a complex network of silicon and oxygen bonds to the native surface of the porous particles.

The materials disclosed herein have a surface further modified with a moiety comprising a diol functionality. By "diol" functionality is meant a hydrocarbon chain bearing a hydroxy group on two adjacent carbon atoms. In some aspects, the moiety comprising a diol functionality comprises a propanediol including an ether functionality. In some aspects, the moiety comprising a diol functionality comprises an alkylsilane having a diol terminus. In some aspects, the moiety comprising a diol functionality has a formula:

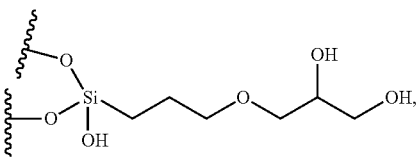 [SMILES: *O[Si](O)(CCCOCC(O)CO)O*]

wherein the wavy lines indicate points of attachment to the surface of the material.

A non-limiting aspect of a material surface modified with an RO-terminated PEG alkylsilane and a diol-terminated alkylsilane is provided in FIG. 1, where R may be H or C1 to C3 alkyl, and n is an integer from about 2 to about 50, such as from about 5 to about 15.

In some aspects, n is from about 9 to about 12, and R is CH₃.

In some aspects, n is from about 8 to about 12, and R is H.

The density of the surface coverage by the moiety comprising a diol functionality (e.g., diol-terminated alkylsilane) may vary, and accordingly, the ratio of the density of coverage of the surface with the moiety comprising a PEG functionality to the density of coverage of the surface with the moiety comprising a diol functionality may vary. Such coverage density and ratios may be determined according to the desired properties of the surface modified material, and determination of the desired coverage density and/or ratio may be accomplished by routine experimentation using methods known to one of skill in the art. In some aspects, the density of diol coverage is at least 0.05 μmol/m². In some aspects, the diol coverage density is in a range from about 0.05 to about 15 μmol/m². For example, in some aspects, the diol functionality is present on the surface of the material at a density from about 0.5 to about 15 μmol/m², from about 0.5 to about 5 μmol/m².

Particulate Stationary Phase Chromatography Material

In some aspects, the material having a modified surface is a particulate stationary phase chromatography material, such as a stationary phase material for size exclusion chromatography. Such material can be composed of one or more particles (i.e., a "base material"), such as one or more spherical particles. The particles are generally spherical but can be any shape useful in chromatography.

The particles have a particle size or distribution of particle sizes. Particle size may be measured, e.g., using a Beckman Coulter Multisizer 3 instrument as follows. Particles are suspended homogeneously in a 5% lithium chloride methanol solution. A greater than 70,000 particle count may be run using a 30 μm aperture in the volume mode for each sample. Using the Coulter principle, volumes of particles are converted to diameter, where a particle diameter is the equivalent spherical diameter, which is the diameter of a sphere whose volume is identical to that of the particle. Particle size can also be determined by light microscopy.

The particles generally have a size distribution in which the average (mean) diameter is from about 1 to about 50 μm, such as from about 1, about 2, about 5, about 10, or about 20, to about 30, about 40, or about 50 µm. In some aspects, the particles have a diameter with a mean size distribution from about 1 to about 20 µm. In some aspects, the particles have a diameter with a mean size distribution from about 1.7 µm to about 5 µm. In some aspects, the particles have a size distribution in which the average diameter is about 1.7 µm.

The particles may be porous or non-porous. In some aspects, the particles are porous, and may be fully porous or superficially porous. Porous materials have a pore size or a distribution of pore sizes. The average pore size (pore diameter) may vary depending on the intended analyte. As described in U.S. Pat. No. 5,861,110, pore diameter can be calculated from 4V/S BET, from pore volume, or from pore surface area. The pore diameter is generally selected to allow free diffusion of molecules in the analyte and mobile phase so they can interact with the stationary phase.

In some aspects, the porous particles have an average pore size from about 40 to about 1000 Å. For example, the average pore size may be from about 40, about 50, about 60, about 70, about 80, about 90, or about 100, to about 200, about 300, about 500, about 600, about 700, about 800, about 900, or about 1000 Å. In some aspects, the average pore size is from about 100 to about 500 Å. In some aspects, the average pore size is from about 100 to about 300 Å. In some aspects, the average pore size is about 125 Å. In some aspects, the average pore size is about 200 Å. In some aspects, the average pore size is about 270 Å. In some aspects, the average pore size is about 1000 Å.

The particles may comprise any suitable organic or inorganic/organic hybrid material. Suitable materials include, but are not limited to, inorganic/organic hybrid materials and polymeric materials. In some aspects, the porous particles comprise or are silica. In some aspects, the particles are porous particles comprising an inorganic/organic hybrid material or a polymer. In some aspects, the porous particles comprise inorganic/organic hybrid materials. In some aspects, the porous particles comprise or are inorganic-organic hybrid ethylene bridged particles having an empirical formula of $SiO_2(O_{1.5}SiCH_2CH_2SiO_{1.5})_{0.25}$. Such materials may be prepared in a sol-gel synthesis by the co-condensation of 1,2-bis(triethoxysilyl) ethane (BTEE) with tetraethyl orthosilicate (TEOS). Suitable procedures are reported in Wyndham et al., *Analytical Chemistry* 2003, 75, 6781-6788 and U.S. Pat. No. 6,686,035, each of which is incorporated herein by reference in its entirety.

Columns

In another aspect is provided a column comprising a surface modified porous particulate stationary phase material as disclosed herein, the column having an interior for accepting the stationary phase material. Generally, the stationary phase will be immobilized in the column. Such columns will have a length and a diameter. In some aspects, the length of the column is about 300 mm. In some aspects, the length of the column is about 150 mm. In some aspects, the length of the column is less than about 300 mm, less than about 150 mm, less than about 100 mm, or less than about 50 mm. In some aspects, the length of the column is about 50 mm, about 30 mm, about 20 mm, or about 10 mm.

In some aspects, the column has a bore size of about 4.6 mm inside diameter (i.d.). In some aspects, the column has a bore size of greater than 4.6 mm i.d. In some aspects, the column has a bore size of about 7.8 mm i.d. In some aspects, the column has a bore size of greater than 7.8 mm i.d. In some aspects, the column has a bore size of greater than about 4 mm i.d., greater than about 5 mm i.d., greater than about 6 mm i.d., or greater than about 7 mm i.d.

Chromatographic Device

In another aspect is provided a chromatographic device. The device comprises a sample injector having a sample injection needle configured for injecting a sample into a mobile phase, a sample reservoir in fluid communication with the sample injector, a chromatography column downstream of and in fluid communication with the sample injector, the chromatography column having fluid connectors and fluid conduits connecting the sample injector and the chromatography column. Each of said fluid conduits, sample injector, sample reservoir, and chromatography column has interior surfaces, said interior surfaces forming a fluidic flow path having wetted surfaces. At least a portion of the wetted surfaces are modified as described herein (i.e., with a moiety comprising a PEG functionality and a moiety comprising a diol functionality). Typically, in such aspects, the material is a polymer or a metal.

Other Devices

In another aspect is provided an analytical or sample preparation device, including but not limited to, a vial, a plate, a pipette tip, or any other similar material handling device. Typically, in such aspects, the material is a polymer or a metal, and the material is included or contained within the device.

Preparation of Surface Modified Materials

Surface modified materials as disclosed herein may be prepared following a simple functionalization procedure. Generally, the material is contacted with a suitable reagent for introduction of the PEG functionality and a suitable reagent for introduction of the diol functionality. The contacting may be conducted simultaneously or sequentially, and in any order.

In some aspects, the functionalization is performed according to a two-step procedure, where the first step comprises contacting the material with a reagent comprising a PEG functionality. In some aspects, the method comprises contacting the material with an alkoxy-terminated or hydroxy-terminated PEG-alkylsilane reagent having the formula:

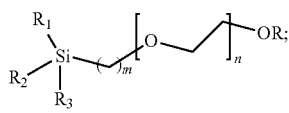

wherein:
R is H or C1-C3 alkyl;
at least one of $R_1$, $R_2$, and $R_3$ is OMe, OEt, Cl, or $N(CH_3)_2$;
m is an integer from about 1 to about 10; and
n is an integer from about 2 to about 50.

In some aspects, $R_1$, $R_2$, and $R_3$ are each OMe, OEt, Cl, or $N(CH_3)_2$. In some aspects, $R_1$, $R_2$, and $R_3$ are each OMe or are each OEt.

In some aspects, m is about 3, or is 3.

In some aspects, n is an average value representing a mixture of different polyethylene glycol chain lengths. For example, in some aspects, n may be 6 to 12, meaning the average distribution of chain lengths falls between 6 and 12 polyethylene glycol units. In other aspects, n may be a specific value, such as from about 6, about 7, about 8, or about 9, to about 10, about 11, or about 12.

In some aspects, $R_1$, $R_2$, and $R_3$ are each OMe, m is 3, and n is 3. In some aspects, R is $CH_3$, $R_1$, $R_2$, and $R_3$ are each OMe, m is 3, and n is 6 to 9, or n is 9 to 12. In some aspects, R is H, $R_1$, $R_2$, and $R_3$ are each OMe, m is 3, and n is 8 to 12.

In some aspects, a catalyst is added to the reaction mixture to promote reaction between the hydroxyl groups on the material surface and the PEG alkylsilane reagent. In some aspects, the catalyst is an organic base such as pyridine or imidazole. In some aspects, the catalyst is an acid. Particularly suitable catalysts are mineral acids, such as hydrochloric acid (HCl). The amount of catalyst added may vary depending on the particle, modifying reagent, and desired surface coverage. In some aspects, the amount of catalyst is based on the weight of the porous particles. In some aspects, the amount of catalyst is from about 5 to about 1000 µL/g of material. In some aspects, the amount of catalyst is about 20 µL/g of material.

Following completion of the reaction with the PEG alkylsilane reagent, the product mixture is generally treated with an aqueous hydrolysis solution to hydrolyze any remaining excess of reagent, and to hydrolyze any remaining alkoxysilyl functionality on the surface modified material. In some aspects, the hydrolysis solution is aqueous ammonium acetate. In some aspects, the hydrolysis solution is aqueous ammonium bicarbonate. The thus-obtained product is then generally washed with water and acetone and dried at 70° C. under reduced pressure for 16 h.

Scheme 1 depicts the surface modification of a material surface with a PEG alkylsilane reagent according to a non-limiting aspect of the disclosure.

In some aspects, the method comprises contacting the material surface modified with the alkoxy-terminated or hydroxy-terminated PEG-alkylsilane with a suitable reagent for introduction of the moiety comprising a diol functionality.

In some aspects, the moiety comprising the diol functionality has a formula:

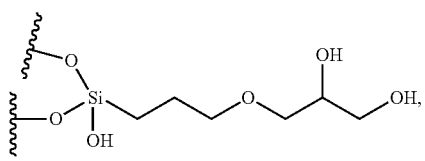 [SMILES: *O[Si](O)(CCCOCC(O)CO)O*]

wherein the wavy lines indicate points of attachment to the surface of the material. One non-limiting example of a suitable reagent for introducing an alkylsilane having a diol terminus is 3-glycidoxypropyl) trimethoxysilane, which may subsequently be subjected to hydrolysis conditions to form the corresponding diol. Another suitable reagent is an alkylsilane having the formula:

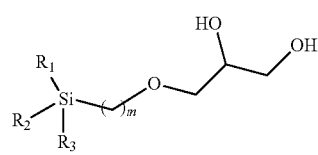

wherein:
at least one of $R_1$, $R_2$, and $R_3$ is OMe, OEt, Cl, or $N(CH_3)_2$; and
m is an integer from about 1 to about 10.

In some aspects, $R_1$, $R_2$, and $R_3$ are each OMe, OEt, Cl, or $N(CH_3)_2$. In some aspects, $R_1$, $R_2$, and $R_3$ are each OMe or are each OEt.

In some aspects, m is about 3, or is 3.

Scheme 2 depicts the surface modification of a PEG-modified material surface with a diol containing functionality according to an aspect where m is 3.

Scheme 1

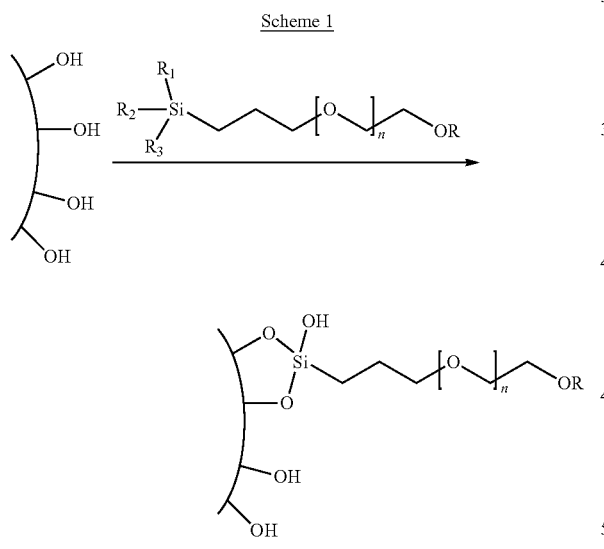

Scheme 2

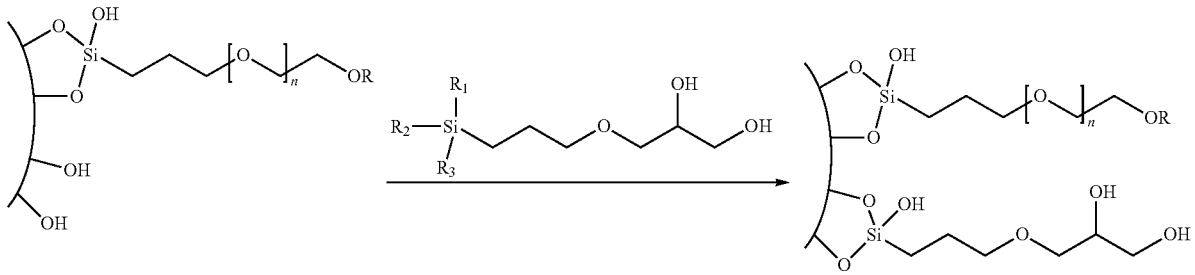

One particularly suitable reaction condition for the condensation is sodium acetate buffer at elevated temperature for up to about 24 hours, followed by hydrolysis with, e.g., dilute acetic acid at elevated temperature for up to about 24 hours.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Aspects of the present technology are more fully illustrated with reference to the following examples. Before describing exemplary aspects of the technology, it is to be understood that the technology is not limited to the details of construction or process steps set forth in the following description. The following examples are set forth to illustrate certain aspects of the present technology and are not to be construed as limiting thereof. Such aspects constitute what the inventors now believe to be the best mode of practicing the technology. Those skilled in the art will recognize that such aspects are capable of modification and alteration. The technology is capable of other aspects and of being practiced or being carried out in various ways.

EXAMPLES

The present technology may be further illustrated by the following non-limiting examples describing surface modified materials and chromatographic separations performed thereon.

Materials

All reagents were used as received unless otherwise noted. Those skilled in the art will recognize that equivalents of the following supplies and suppliers exist and, as such, the suppliers listed below are not to be construed as limiting.

The NISTmAb reference standard RM8671, referred to herein as "NISTmAb," was obtained from the National Institute of Standards and Technology (NIST; Gaithersburg, MD). The NISTmAb material is a recombinant humanized IgG1κ expressed in murine suspension culture. It is an ~150 kDa homodimer of two identical light chains and two identical heavy chains linked through both inter- and intra-chain disulfide bonds. A vial of RM 8671 contains 800 μL of 10 mg/mL IgG1κ monoclonal antibody in 12.5 mmol/L L-histidine, 12.5 mmol/L L-histidine HCl (pH 6.0).

Formulated ado-trastuzumab emtasine (Kadcyla, 2 mg/mL) was obtained from Genentech and diluted to 2-5 mg/mL concentration. Kadcyla was chosen due to the difficulty in mobile phase optimization owing to hydrophobic secondary interactions typically encountered in SEC separations.

Methods

The surface area (SA), pore volume (PV), and pore diameter (PD) of materials provided herein were measured using the multi-point N sorption method (Micromeritics ASAP 2400; Micromeritics Instruments Inc., Norcross, Ga.). The SA was calculated using the Brunauer-Emmett-Teller (BET) method, the PV was the single point value determined for P/Pd-0.98 to 0.99, and the PD was calculated from the desorption leg of the isotherm using the Barrett, Joyner, and Halenda (BJH) method. For average PD values above 500 Å, the pore diameter and pore volume were measured by mercury porosimetry (Micromeritics AutoPore IV. Micromeritics, Norcross, Ga.). Skeletal densities were measured using a Micromeritics AccuPyc1330 Helium Pycnometer (V2.04N, Norcross, Ga.).

Particle sizes were measured using a Beckman Coulter Multisizer 3 analyzer (Miami, Fla.; 30-um aperture, 70,000 counts). The particle diameter (dp) was measured as the 50% cumulative diameter of the volume-based particle size distribution. The width of the distribution was measured as the 90% cumulative volume diameter divided by the 10% cumulative volume diameter (denoted 90/10 ratio).

The surface coverage was determined by the difference in particle % carbon before and after the surface modification, as measured by elemental analysis. Percent carbon (% C) and percent nitrogen (% N) values were measured by combustion analysis using a LECO TruMac carbon-nitrogen/sulfur Analyzer (Leco Corporation, Michigan, US).

Aspects of stationary phase materials were prepared as described below in the Examples. The stationary phase materials of Examples 1 and 2 were evaluated for SEC performance and compared against a reference column. Specifically, each column stationary phase material was evaluated for ionic and hydrophobic secondary interactions.

When a protein analyte and the stationary phase carry the same charge, ion-exclusion takes place due to electrostatic repulsion (decrease in protein elution time). When the protein and the stationary phase carry an opposite charge, ion-exchange takes place (increase in elution time). To evaluate such ionic secondary interactions effects, NISTmAb injections were performed in mobile phases with increasing salt concentrations (100 mM sodium phosphate dibasic, pH 6.8, with 0, 50, 100 and 200 mM NaCl) and % change in USP tailing was calculated.

Hydrophobic secondary interactions between the protein and hydrophobic sites on the stationary phase can lead to increased retention and poor peak shape for proteins. To evaluate such hydrophobic secondary interactions effects, antibody-drug conjugate (ADC) injections of Kadcyla were performed in mobile phases with increasing acetonitrile % (100 mM Sodium Phosphate dibasic, 200 mM NaCl, pH 6.8, with 0, 5, 10 and 15% ACN) and % change in USP tailing was calculated.

All separations were performed using a commercially available high performance liquid chromatography (HPLC) system (ACQUITY® UPLC® H-Class Bio system; available from Waters Corporation, Milford, MA). Unless otherwise indicated, separations were performed at a temperature of 30° C. and a flow rate of 0.35 mL/min, with detection by UV absorption at 280 nm.

Example 1. Preparation of a Column Containing BEH200 Particles Surface Modified with a Methoxy-Terminated PEG Alkylsilane and a Diol-Terminated Alkylsilane (PEG-Bonded and Diol Coated)

Inorganic-organic hybrid ethylene bridged particles (200 Å; prepared following the method as described in U.S. Pat. No. 6,686,035) were dispersed in toluene (10 mL/g). The residual water was removed from the material by azeotropic distillation (110° C., 1-2 h). The reaction temperature was reduced below 40° C. and [methoxy(polyethyleneoxy)$_{9-12}$propyl]trimethoxysilane was added (10 μmol/m$^2$). The reaction was stirred for 5 min and the temperature was increased to 110° C. for 20 h. The reaction was then cooled to RT and the particles were isolated via filtration. The particles were subsequently washed using the following sequence: 5×toluene, 1×acetone, 4×acetone/water (1:1 v/v), and 2×acetone.

Following the bonding reaction, hydrolysis was performed with ammonium acetate. The particles were dispersed in a mixture of acetone (8.2 mL/g particle) and 0.12 M ammonium acetate solution (1.8 mL/g particle), and the mixture was stirred at 59° C. for 2 h. The reaction was then cooled to <40° C. and the particles were isolated via filtration. The isolated particles were subsequently washed three times with acetone/water (1:1 v/v) and twice with acetone. The isolated, surface modified particles were dried under vacuum at 70° C. for 16 h.

The modified particles were then dispersed in 1.0 M HCl solution (8.4 mL/g particle) and the mixture was stirred at 100° C. for 20 h. The reaction was then cooled below 40° C. and the particles were isolated via filtration. The isolated particles were washed with water until the pH of the filtrate was higher than 5 and then washed with methanol ×3. The isolated, surface modified particles were dried under vacuum at 70° C. for 16 h.

To apply the diol coating to the PEG-bonded porous particles, 20 mM pH 5.5 sodium acetate buffer (5 mL buffer per gram particles) was added to a round bottom flask equipped with a thermometer, condenser, and mechanical stirring apparatus. The solution was heated to 70° C. Once at temperature, (3-glycidoxypropyl) trimethoxysilane was added to the flask (10.22 μmol/m$^2$) and allowed to mix at 70° C. for 1 hour. The previously prepared PEG-bonded particles were added to the flask (1 gram per 5 mL of buffer solution) while at 70° C. The mixture was then stirred at 70° C. for 20 hours. The flask was cooled below 40° C. and then filtered and the product was washed thrice with deionized water then transferred to a new, clean round bottom flask equipped with a thermometer, condenser, and mechanical stirring apparatus. Acetic acid (0.1 M) was added to the flask (5 mL/gram material) and the slurry was heated to 70° C. for 20 hours. After heating, the flask was cooled below 40° C. and then filtered. The product was washed with deionized water until the pH of the supernatant increased to above 5. The material was then washed thrice with methanol. The SEC particles were dried in a vacuum oven at 70° C. The physical properties of the particles are provided in Table 1. SEC columns (4.6×150 mm) were packed with these materials as prototypes.

TABLE 1

Characterization of PEG-bonded and diol-coated BEH200 particles

| Base Particle | Carbon % | Surface Area (m$^2$/g) | Pore Volume (cc/g) | Pore Diameter (A) | Total surface coverage (μmol/m$^2$) |
| --- | --- | --- | --- | --- | --- |
| BEH200, 3.0 um, 225 Å, 90/10 = 1.64 | 12.61 | 153.3 | 0.93 | 193 | 5.55 |

Example 2. Preparation of a Column Containing BEH200 Particles Surface Modified with a Methoxy-Terminated PEG Alkylsilane and a Diol-Terminated Alkylsilane (PEG and Diol Coated)

A silane reagent was prepared from the incomplete hydrolytic condensation of [methoxy(polyethyleneoxy)$_{9-12}$propyl]trimethoxysilane. To [methoxy(polyethyleneoxy)$_{9-12}$propyl]trimethoxysilane was added ethanol (3.1 mol ethanol/mol silane reagent) and 0.1 M HCl (15.6 g/mol of silane reagent). The solution was heated at 70° C. for 18 h under an inert atmosphere. The reaction temperature was then increased to 90° C. for atmospheric distillation to remove the ethanol. The temperature was then increased to 100° C. for 1 h under an inert atmosphere. The reaction mixture was cooled to room temperature to obtain the incomplete (~50%) condensation product.

Inorganic-organic hybrid ethylene bridged particles (200 Å; prepared following the method as described in U.S. Pat. No. 6,686,035) were fully dispersed in toluene (21 mL/g of particles). The residual water was removed from the material by azeotropic distillation (110° C., 1 h). The reaction temperature was held at 40° C. while the silane reagent (1.0 g/g particle) was added and allowed to stir for 10 minutes. Catalytic aqueous NH$_4$OH was added (0.05 g/g particle). The reaction was stirred for an additional 10 minutes at 40° C., then increased to 60° C. for 2 h. The reaction was then cooled to room temperature and the particles were isolated via filtration. The particles were subsequently washed twice with ethanol (10 ml/g) then dispersed in 70/30 (v/v) water/ethanol (10 mL/g). Ammonium hydroxide solution (1 g NH$_4$OH/g particle) was added, and the mixture was stirred at 50° C. for 2 h. The reaction was then cooled to <40° C. and the particles were isolated via filtration. The isolated particles were washed (10 ml/g) using the following sequence: 2×methanol/water (1:1 v/v) and 2×methanol. The isolated, surface modified particles were dried at 70° C. for 16 h under vacuum. The process was repeated as needed to achieve the desired concentration of surface modifier.

To ensure uniformity of the PEG coating layer, the modified particles were exposed to elevated temperatures (100-140° C.) and pH (8-9.8) following the hydrothermal treatment process according to the procedures reported in U.S. Pat. Nos. 6,686,035, 7,223,473, and 7,919,177, each to Jiang) and International Patent Application Publication No. WO2008/103423 to Wyndham). The modified particles were then dispersed in 1.0 M HCl solution (8.4 mL/g particle) and the mixture was stirred at 100° C. for 20 h. The reaction was then cooled below 4° C. and the particles were isolated via filtration. The isolated particles were washed with water until the pH of the filtrate was higher than 5 and then washed with methanol ×3. The isolated, surface modified particles were dried under vacuum at 70° C. for 16 h.

To apply the diol coating to the PEG-coated porous particles, 20 mM pH 5.5 sodium acetate buffer (5 mL buffer per gram particles) was added to a round bottom flask equipped with a thermometer, condenser, and mechanical stirring apparatus. The solution was heated to 70° C. Once at temperature, (3-glycidoxypropyl) trimethoxysilane was added to the flask (10.22 μmol/m$^2$) and allowed to mix at 70° C. for 1 hour. PEG-coated particles were added to the flask (1 gram per 5 mL of buffer solution) while at 70° C. The mixture was then stirred at 70° C. for 20 hours. The flask was cooled below 40° C. and then filtered and the product was washed thrice with Milli Q water then transferred to a new, clean round bottom flask equipped with a thermometer, condenser, and mechanical stirring apparatus. Acetic acid (0.1 M) was added to the flask (5 mL/gram material) and the slurry was heated to 70° C. for 20 hours. After heating, the flask was cooled below 40° C. and then filtered. The product was washed with Milli Q water until the pH of the supernatant increased to above 5. The material was then washed thrice with methanol. The SEC particles were dried in a vacuum oven at 70° C. The physical properties of the particles are provided in Table 2. SEC columns (4.6×150 mm were packed with these materials as prototypes. The prototypes with PEG coated with diol coating were evaluated for the secondary interactions.

TABLE 2

Characterization of PEG- and diol-coated BEH200 particles

| Base Particle | Carbon % | Surface Area (m²/g) | Pore Volume (cc/g) | Pore Diameter (Å) | Total surface coverage (μmol/m²) |
|---|---|---|---|---|---|
| BEH200, 3.0 μm, 225 Å, 90/10 = 1.64 | 14.14 | 138.8 | 0.89 | 195 | 6.19 |

Example 3. Evaluation of Secondary Interactions of Columns of Examples 1 and 2

The non-specific secondary interaction performance of the prototype SEC columns of Examples 1 and 2 were evaluated and compared with a reference diol-coated BEH200 column. To evaluate ionic secondary interactions, NISTmAb injections were performed in a mobile phase with increasing salt concentrations (100 mM sodium phosphate dibasic, pH 6.8, with 0, 50, 100, or 200 mM NaCl). To evaluate hydrophobic secondary interactions, antibody-drug conjugate (ADC) injections of Kadcyla were performed in a mobile phase with increasing acetonitrile concentration (100 mM Sodium Phosphate dibasic, 200 mM NaCl, pH 6.8, with 0, 5, 10, or 15% ACN).

Figure 2A:
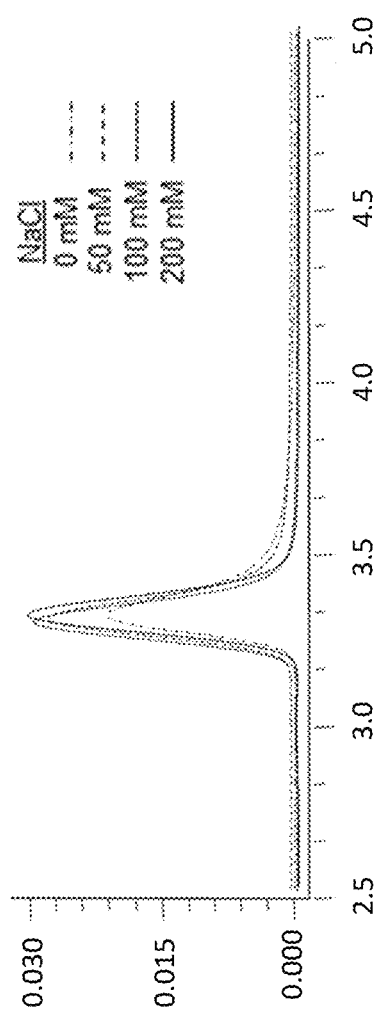
FIG. 2A depicts exemplary chromatographic separations of NIST mAb on a prototype methoxy-terminated PEG and diol-terminated alkylsilane surface modified inorganic-organic hybrid particle SEC column packed with 3.0 μm particles with average pore sizes of 200 Å, with a mobile phase comprising aqueous sodium phosphate buffer and varying concentrations of sodium chloride.
Figure 2B:
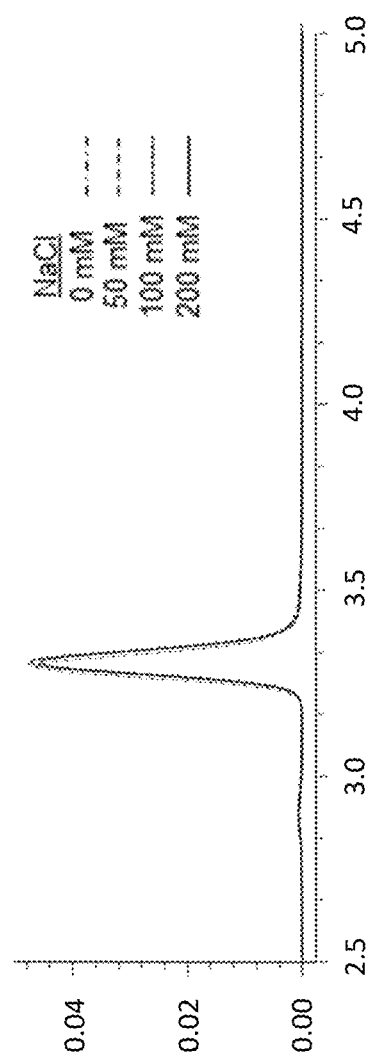
FIG. 2B depicts exemplary chromatographic separations of NIST mAb on a reference diol-coated inorganic-organic hybrid particle SEC column packed with 3.0 μm particles with average pore sizes of 200 Å column with a mobile phase comprising aqueous sodium phosphate buffer and varying concentrations of sodium chloride.
Figure 2C:
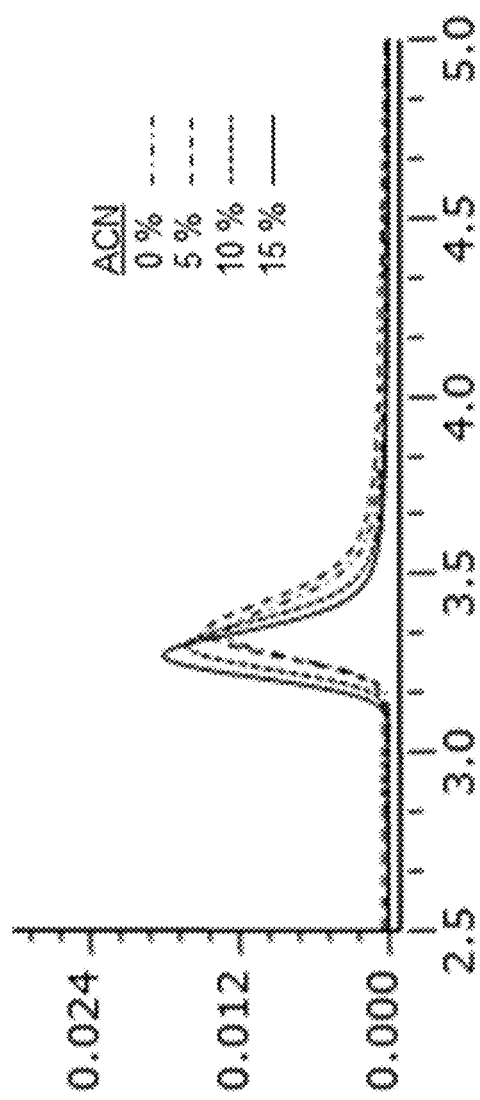
FIG. 2C depicts exemplary chromatographic separations of Trastuzumab emtansine (Kadcyla; Genentech) on a prototype methoxy-terminated PEG and diol-terminated alkylsilane surface modified inorganic-organic hybrid particle SEC column packed with 3.0 μm particles with average pore sizes of 200 Å, with a mobile phase comprising aqueous sodium phosphate buffer and varying concentrations of acetonitrile.
Figure 2D:
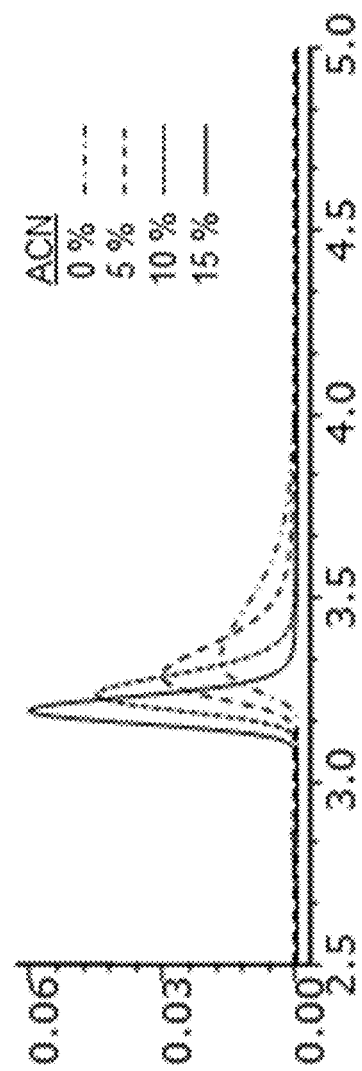
FIG. 2D depicts exemplary chromatographic separations of Trastuzumab emtansine (Kadcyla; Genentech) on a reference diol-coated inorganic-organic hybrid particle SEC column packed with 3.0 μm particles with average pore sizes of 200 Å column with a mobile phase comprising aqueous sodium phosphate buffer and varying concentrations of sodium chloride.

The test results for ionic secondary interactions for Example 1 and the reference column are provided in FIG. 2A and FIG. 2B, respectively. The test results for hydrophobic secondary interactions for Example 1 and the reference column are provided in FIG. 2C and FIG. 2D, respectively.

Figure 3C:
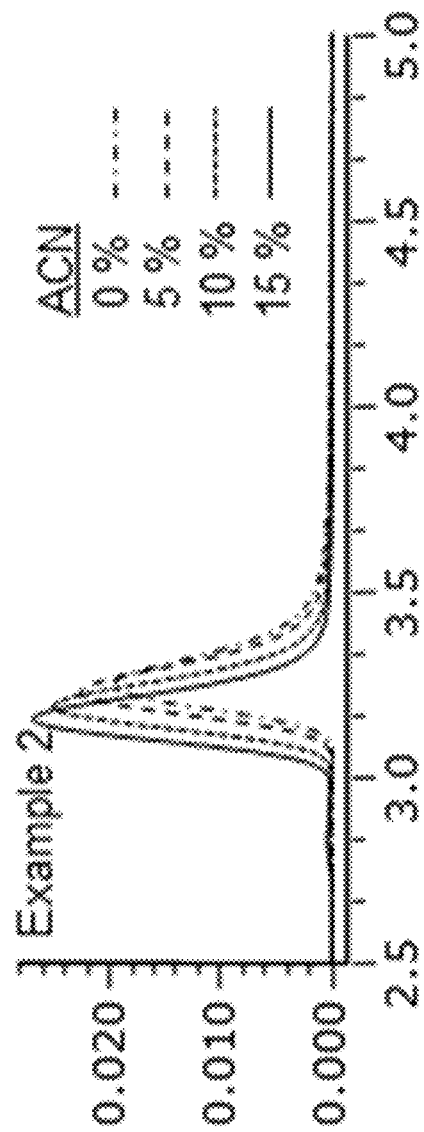
FIG. 3C depicts exemplary chromatographic separations of Trastuzumab emtansine (Kadcyla; available from Genentech) on a prototype methoxy-terminated PEG and diol-terminated alkylsilane surface modified inorganic-organic hybrid particle SEC column packed with 3.0 μm particles with average pore sizes of 200 Å, with a mobile phase comprising aqueous sodium phosphate buffer and varying concentrations of acetonitrile.
Figure 3D:
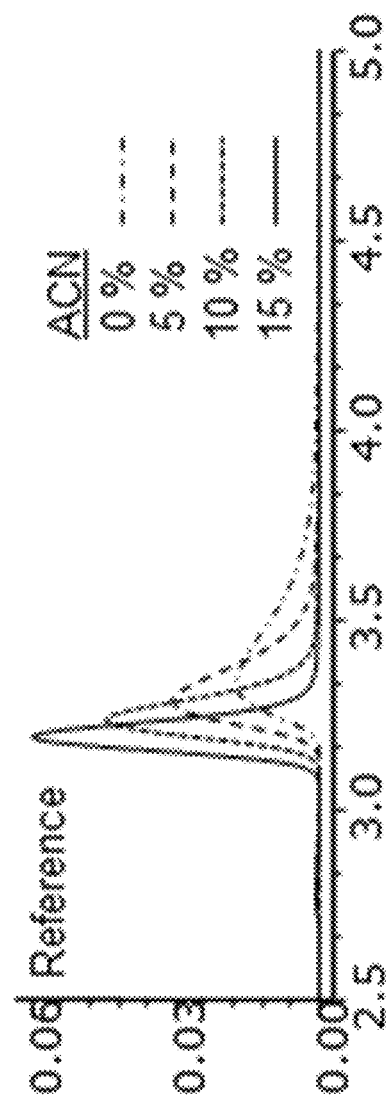
FIG. 3D depicts exemplary chromatographic separations of Trastuzumab emtansine (Kadcyla; available from Genentech) on a reference diol-coated inorganic-organic hybrid particle SEC column packed with 3.0 μm particles with average pore sizes of 200 Å with a mobile phase comprising aqueous sodium phosphate buffer and varying concentrations of sodium chloride.

The test results for ionic secondary interactions for Example 2 and the reference column are provided in FIG. 3A and FIG. 3B, respectively. The test results for hydrophobic secondary interactions for Example 2 and the reference column are provided in FIG. 3C and FIG. 3D, respectively.

The results show that even a very low surface coverage of MeO-PEG alkylsilane, combined with the diol-terminated alkylsilane modification, made a significant improvement in the hydrophobic secondary interaction performance of the resultant materials relative to the reference diol-coated BEH200 material.

The invention claimed is:

1. A material having a surface, wherein said surface is modified with:
   a moiety comprising a polyethylene glycol (PEG) functionality at a coverage density of from about 0.05 μmol/m² to about 15 μmol/m²; and
   a moiety comprising a diol functionality at a coverage density of at least 0.05 μmol/m²,
   wherein the moiety comprising the diol functionality comprises an alkylsilane having a diol terminus.

2. The material of claim 1, wherein the PEG functionality is hydroxy-terminated.

3. The material of claim 2, wherein the hydroxy-terminated PEG functionality is a hydroxy-terminated PEG-alkylsilane.

4. The material of claim 1, wherein the PEG functionality is alkoxy-terminated.

5. The material of claim 4, wherein the alkoxy-terminated PEG functionality is an alkoxy-terminated PEG-alkylsilane.

6. The material of claim 5, wherein the alkoxy-terminated PEG functionality is a methoxy-terminated PEG-alkylsilane.

7. The material of claim 1, wherein the moiety comprising the PEG functionality has a formula

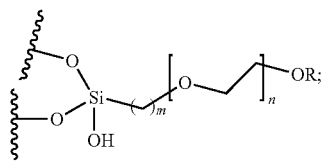

wherein:
   R is H or C1-C3 alkyl;
   m is an integer from about 1 to about 10;
   n is an integer from about 2 to about 50; and
wherein the wavy lines indicate points of attachment to the surface of the material.

8. The material of claim 7, wherein n is from about 5 to about 15, and m is 2 or 3.

9. The material of claim 7, wherein R is CH₃, m is about 3, and n is from about 9 to about 12.

10. The material of claim 7, wherein R is H, m is about 3, and n is from about 8 to about 12.

11. The material of claim 1, wherein the moiety comprising the diol functionality has a formula:

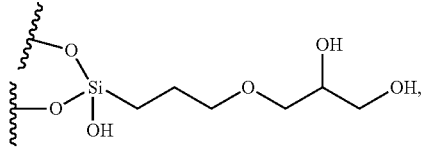 [SMILES: *O[Si](O)(CCCOCC(O)CO)O*]

wherein the wavy lines indicate points of attachment to the surface of the material.

12. The material of claim 1, wherein the material is a porous particulate stationary phase chromatography material.

13. The material of claim 12, wherein particles of the porous particulate stationary phase chromatography material have a pore size from about 0 to about 3000 Å, from about 20 to about 3000 Å, or from about 40 to about 1000 Å.

14. The material of claim 12, wherein the porous particulate stationary phase chromatography material is silica, a silica/organic hybrid, a polymer, or a combination thereof.

15. The material of claim 12, wherein the porous particulate stationary phase chromatography material is silica.

16. The material of claim 12, wherein the porous particulate stationary phase chromatography material is a silica/organic hybrid.

17. A column comprising the porous particulate stationary phase material of claim 12, the column having an interior for accepting the stationary phase material.

18. The material of claim 12, wherein the material is a polymer or a metal, and where the material is included or contained within a vial, a plate, a pipette tip, or an analytical or sample preparation device.

* * * * *